Sept. 13, 1932.    S. B. HASELTINE    1,877,309
BRAKE CHAIN ATTACHMENT
Filed Jan. 14, 1931
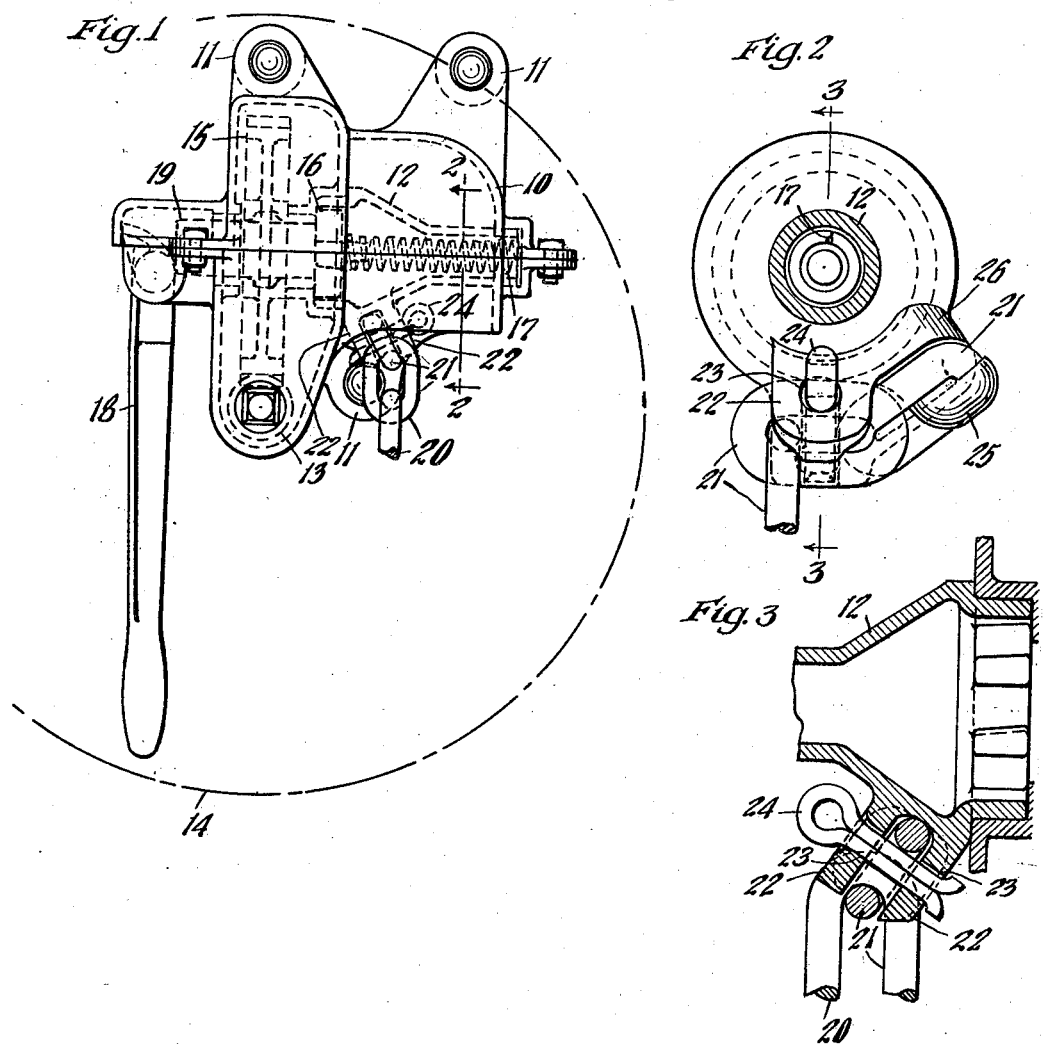
Witness
Wm. Geiger
Inventor
Stacy B. Haseltine
By Joseph Harris
His Atty.

Patented Sept. 13, 1932

1,877,309

UNITED STATES PATENT OFFICE

STACY B. HASELTINE, OF CHICAGO, ILLINOIS, ASSIGNOR TO W. H. MINER, INC., OF CHICAGO, ILLINOIS, A CORPORATION OF DELAWARE

BRAKE CHAIN ATTACHMENT

Application filed January 14, 1931. Serial No. 508,791.

This invention relates to improvements in brake chain attachments for brake mechanisms of railway cars.

The main object of this invention is to provide simple and efficient means of rugged design for securing the brake chain to the chain winding element or drum of a brake mechanism, by which the usual brake chain may be readily secured to and detached from the drum when desired, wherein a rugged anchoring member is provided on the chain winding drum with which one of the links of the chain is directly engaged, accidental or unintentional disengagement of the link being prevented by means cooperating with the chain for restricting movement of the engaging link, which means is entirely relieved of all strains due to tension under which the brake chain is placed during operation of the brake mechanism.

Other objects of the invention will more clearly appear from the description and claims hereinafter following.

In the drawing, forming a part of this specification, Figure 1 is a front elevational view of a hand brake mechanism, illustrating the same as applied to the vertical end wall of a railway car, and showing my improvements in connection therewith. Figure 2 is a vertical, sectional view corresponding substantially to the line 2—2 of Figure 1, illustrating the parts on an enlarged scale. And Figure 3 is a vertical, sectional view corresponding substantially to the line 3—3 of Figure 2.

In said drawing, 10 designates a housing in which the operative parts of the brake mechanism are contained, the housing being provided with securing lugs 11—11 by which the same is fixed to the vertical end wall of the railway car. As shown in Figure 1, the housing is of the two part type, being divided centrally along a horizontal plane, the top and bottom sections thereof being secured together by bolts or equivalent securing elements, extending through cooperating flanges or lugs on the two housing sections. The brake mechanism proper comprises a chain winding drum 12, a worm element 13, which is operated by the usual hand wheel shown in dotted lines in Figure 1 and indicated by 14, the worm element being disposed below the drum at right angles to the same and having its opposite ends journaled in the front and rear walls of the housing. The worm 13 meshes with a worm wheel 15, which is rotatable about the same axis as the drum. Any suitable clutch means is employed for connecting the worm wheel to the drum, said clutch means being designated generally by 16. The clutch means is held in clutching engagement by a spring 17 and is actuated to disengage the same by means of a cam lever 18 mounted in the lefthand end of the housing, as shown in Figure 1, and cooperating with a shaft member 19 formed integral with the clutch 16. The mechanism hereinbefore described is of well known form and does not form a part of the present invention and, therefore, needs no further description. In the operation of the mechanism thus far described, the hand wheel is rotated to tighten the brakes, thereby actuating the worm wheel, which in turn through the clutch 16 rotates the drum 12 in chain winding direction. To release the brakes, the lever 18 is actuated, thereby disengaging the clutch and permitting free rotation of the chain winding drum 12 with respect to the operating means, thereby permitting the hand wheel to remain stationary during said releasing action.

In carrying out my invention, I provide the usual brake chain, which is indicated by 20, and is composed of a plurality of inter-connected links 21—21. The chain winding drum 12 has spaced ears 22—22 projecting therefrom, the ears being preferably disposed at an angle to the axis of rotation of the drum, as clearly shown in Figure 3. The ears 22 are provided with alined openings 23—23 of somewhat elongated form in a direction transversely of the ears 22—22 and in that direction taken by the chain when under load. These openings are adapted to accommodate a cotter pin 24 for a purpose hereinafter pointed out. Adjacent the ears 22—22, the drum has a hook member 25 projecting therefrom, said hook member being formed integral with the drum and of substantially oval cross section, so as to completely fill the available space in the opening of the end link 21 when applied thereto, thus providing for the maximum strength of the same. The section of the drum adjacent the hook is thickened, as indicated at 26, to reinforce the same and also provide a flat bearing surface for the end link of the chain. As most clearly shown in Figure 2, the end link 21 of the chain is engaged over the hook 25 so as to anchor the same to the drum. The link 21 next adjacent to the end link is accommodated between the ears 22—22 and the cotter pin 24 extends through said link in the space between the first and third links so as to hold the second link between the ears 22—22 and prevent outward swinging movement of said link. As will be evident, upon reference to Figure 2, the link 21 immediately adjacent to and to the left of the link which receives the cotter pin, being inter-engaged with the same and disposed transversely thereof, and transversely of the opening between the ears 22—22, has shouldered engagement with the ears. From this arrangement as described, it will be evident that outward swinging of the chain is prevented by the cotter and endwise movement of chain in a direction to disengage same from the hook is eliminated by engagement of the second and third links thereof with the hook 25 and the shoulders of the ears 22—22 respectively.

In attaching the chain to the drum, the end link 21 is first engaged over the end of the hook 25 and the first three links 21—21 of the chain are swung bodily as a unit to the position shown in Figure 2, entering the second link from the end of the chain between the ears 22—22. The cotter pin 24 is then engaged through the opening of said second link from the end to hold the same against outward swinging movement, as hereinbefore pointed out. When the chain has been thus attached, the hook 25 serves to securely anchor the same, disengagement of the end link from said hook being entirely prevented in the manner hereinbefore pointed out.

By the arrangement of attaching means hereinbefore described, the strain due to tension on the brake chain is taken entirely by the hook member 25, no strain being transmitted to the cotter pin on account of the elongated shape of the opening 23, the cotter pin serving only to restrict swinging movement of the chain so as to maintain the end link 21 operatively engaged with the hook member 25.

In detaching the chain from the drum, the cotter pin 24 is first removed. The links 21 at the end of the chain are then swung bodily about the hook 25 to withdraw the second link from the end from between the ears 22—22, thus freeing the chain from the ears and readily permitting unhooking of the end link.

I have herein shown and described what I now consider the preferred manner of carrying out my invention, but the same is merely illustrative and I contemplate all changes and modifications that come within the scope of the claims appended hereto.

I claim:

1. In a chain attachment for brake mechanisms, the combination with a winding drum; of a brake chain including a plurality of inter-connected links; an anchoring hook on said drum with which one of the links of the chain is engaged; abutment means on said drum having shouldered engagement with another link of the chain for restricting endwise movement of the connected links of the chain including said first named link to maintain said first named link engaged with said hook; and detachable means for maintaining the chain in position with said second named link in said shouldered engagement.

2. In a chain attachment for brake mechanisms, the combination with a winding element; of a brake chain including a plurality of inter-connected link members; a rigid anchoring member on said winding element over which one of said link members is engaged; and detachable means connected to the drum and extending through the next adjacent link member for restricting movement of the chain with respect to the winding element to maintain said first named link member engaged with said anchoring member.

3. In a chain attachment for brake mechanisms, the combination with a winding element; of a brake chain including a plurality of inter-connected link members; a rigid anchoring hook on said winding element on which the end link member of the chain is hung, said hook having a thickened shank portion; and a retainer connected to the winding element, said retainer extending through another link of the chain to restrict movement of the end portion of said chain to hold said last named link in position to engage the shank of the hook, engagement of said last named link with said shank maintaining said end link member operatively engaged with the hook.

4. In a chain attachment for brake mechanisms, the combination with a winding drum; of a brake chain including inter-connected links; a rigid anchoring hook on the drum with which the end link of the chain is engaged; spaced ears on said drum adjacent said hook and between which the link next adjacent to the end link is accommodated and with which another link of said chain has shouldered engagement; and a retaining pin extending through said ears and said link next adjacent to the end link, thereby restricting movement of said links to maintain said shouldered engagement and thereby maintain operative engagement of said end link and hook.

In witness that I claim the foregoing I have hereunto subscribed my name this 12th day of January, 1931.

STACY B. HASELTINE.